US005916139A

United States Patent [19]
Tieben

[11] Patent Number: 5,916,139
[45] Date of Patent: Jun. 29, 1999

[54] HYDRAULIC SYSTEM AND PUMP

[75] Inventor: James B. Tieben, Dodge City, Kans.

[73] Assignee: My-D Han-D Mfg. Co. Inc., Dodge City, Kans.

[21] Appl. No.: 08/931,585

[22] Filed: Sep. 16, 1997

[51] Int. Cl.$^{6}$ .......... F16D 31/02
[52] U.S. Cl. .......... 60/413; 60/477; 418/206.6
[58] Field of Search .......... 60/413, 477; 418/104, 418/206.6

[56] References Cited

U.S. PATENT DOCUMENTS

| | | | |
|---|---|---|---|
| 2,672,100 | 3/1954 | Harvey | 418/206.6 |
| 3,985,063 | 10/1976 | Lemon | 60/413 X |
| 4,465,442 | 8/1984 | Lang et al. | 418/206.6 X |
| 4,561,248 | 12/1985 | Quin et al. | 60/413 |
| 4,648,817 | 3/1987 | Mariani | 418/206.6 X |
| 4,671,126 | 6/1987 | Sable . | |
| 4,917,583 | 4/1990 | Frings et al. | 418/206.6 X |
| 5,196,770 | 3/1993 | Champs et al. . | |

FOREIGN PATENT DOCUMENTS

| | | | |
|---|---|---|---|
| 675835 | 12/1963 | Canada | 60/413 |
| 2697055 | 4/1994 | France . | |
| 1669815 | 8/1991 | Russian Federation | 60/413 |

OTHER PUBLICATIONS

"Lufkin Long Stroke Hydraulic pumping unit," Lufkin Foundry & Machine Co., Lufkin, TX, pp. 3066, 3067, prior to Aug. 1997 (no actual date).

*Primary Examiner*—Hoang Nguyen
*Attorney, Agent, or Firm*—Brinks Hofer Gilson & Lione

[57] ABSTRACT

A hydraulic system includes a hydraulic fluid pump, a hydraulic cylinder, and a pressure accumulator. A hydraulic fluid valve is movable between a first position and a second position. In the first position, the valve directs fluid from the pump outlet to the hydraulic cylinder and from the accumulator to the pump inlet. In the second position the valve directs fluid from the pump outlet to the accumulator and from the hydraulic cylinder to the pump inlet. In this way pressurized hydraulic fluid from the cylinder can be stored in the accumulator for reuse. The pump includes high pressure seals at both ends of the driven shaft in order to reduce or eliminate offset forces of the type that might increase friction and wear.

7 Claims, 4 Drawing Sheets

HYDRAULIC SYSTEM AND PUMP

BACKGROUND OF THE INVENTION

The present invention relates to a high efficiency hydraulic system for delivering pressurized hydraulic fluid to a hydraulic actuator, and to a pump suitable for use in such a system.

In one type of conventional hydraulic system, a gear pump is used to pressurize hydraulic fluid and to direct the pressurized hydraulic fluid to a hydraulic actuator such as a cylinder used to perform work. Once the cylinder completes its cycle (either extension or retraction), hydraulic fluid from the pump is bypassed to the supply tank of the pump or is directed to the opposite side of the cylinder piston for the return stroke. Because the supply tank is at low pressure, it is necessary for the pump again to develop the full working pressure required for the cylinder to perform its function during the next cycle.

SUMMARY OF THE INVENTION

The present invention is defined by the following claims, and nothing in this section should be taken as a limitation on those claims. By way of introduction, it can be stated here that the preferred embodiment described below is a hydraulic system that operates at high efficiency. This hydraulic system includes a pressure accumulator and a control valve. In the first position of the control valve, pressurized hydraulic fluid from the accumulator is supplied to the inlet of the pump, and the outlet of the pump is coupled to the hydraulic actuator to cause the hydraulic actuator to extend or retract. When the valve is moved to the second position, the hydraulic actuator is coupled to the inlet of the pump and the outlet of the pump is coupled to the accumulator. As the hydraulic actuator exhausts hydraulic fluid, the exhausted fluid is passed through the pump and the valve to the accumulator, where it is stored under substantial pressure, ready for use in the next cycle. Since the stored, pressurized hydraulic fluid of the accumulator is applied to the inlet of the pump in the next cycle, reduced pumping energy is required in the next cycle as compared to the conventional hydraulic system described above.

This invention also relates to an improved pump that is provided with high pressure seals between the pump body and both of the shafts extending outwardly from a central element such as the driven gear of a gear pump. By using high pressure seals on both shafts associated with the driven gear, internal pressures are balanced and wear and friction are reduced.

DETAILED DESCRIPTION OF THE PRESENTLY PREFERRED EMBODIMENTS

Figure 1:
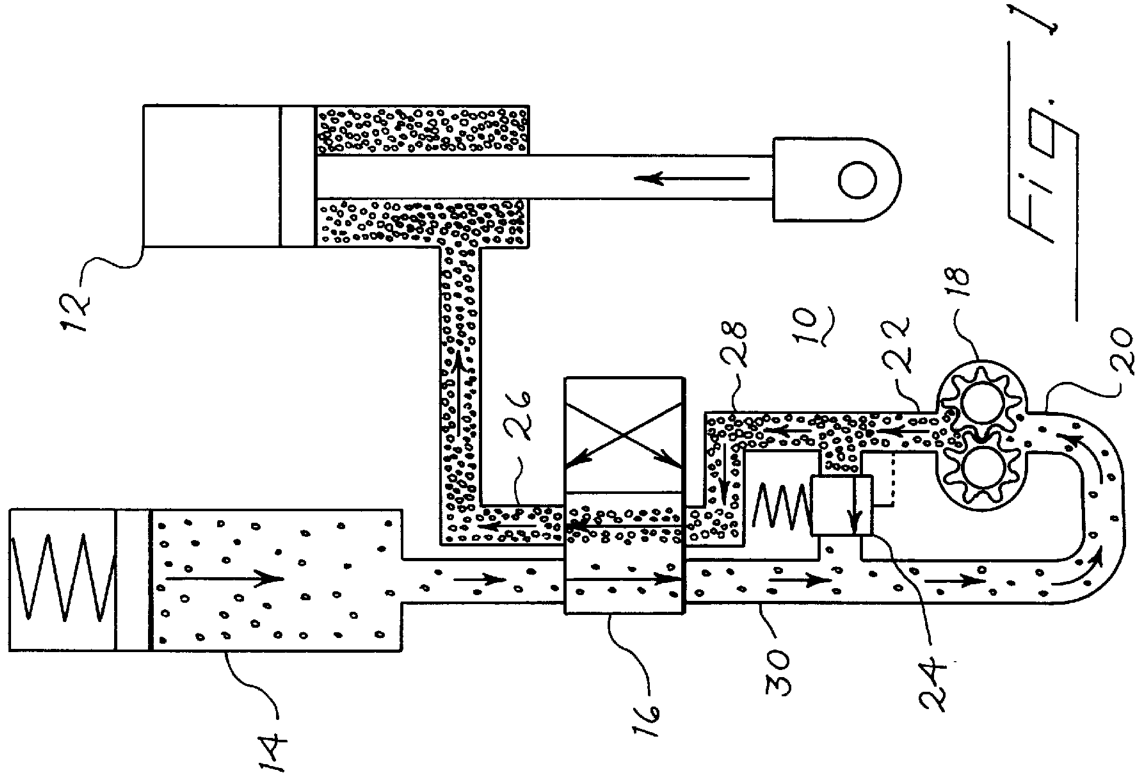

Turning now to the drawings, FIG. 1 shows a schematic view of a hydraulic system 10 that incorporates the presently preferred embodiment of this invention. The hydraulic system 10 includes a hydraulic actuator such as a cylinder 12 and a pressure accumulator 14. The hydraulic actuator can take any suitable form, including single or double acting cylinders, rotary actuators, and other hydraulic actuators. Depending upon the application, the hydraulic actuator can utilize a piston as illustrated in the drawing, or alternately can be formed using a diaphragm.

The accumulator 14 can be any suitable pressure accumulator, including those using pistons, diaphragms, bladders or membranes. Typically, a contained volume of a suitable gas, a spring, or a weight is provided such that the pressure of hydraulic fluid in the accumulator 14 increases as the quantity of hydraulic fluid stored in the accumulator increases. The hydraulic cylinder 12 and the accumulator 14 are connected in parallel at one side of a direction control valve 16. The port 26 on the valve 16 coupled to the hydraulic cylinder 12 will be referenced as hydraulic actuator or cylinder port in this specification. The other side of the direction control valve 16 includes two passageways that are coupled respectively to the inlet 20 and the outlet 22 of a hydraulic fluid pump 18. In the embodiment of FIG. 1 the pump 18 is illustrated as a gear pump, though other pumps such as vane pumps, piston pumps and rotary screw pumps can be used. As shown in FIG. 1, a pilot-operated bypass valve 24 is provided. The bypass valve 24 provides free communication between the pump outlet 22 and the pump inlet 20 in the event the pressure in the pump outlet 22 exceeds a predetermined value.

Figure 2:
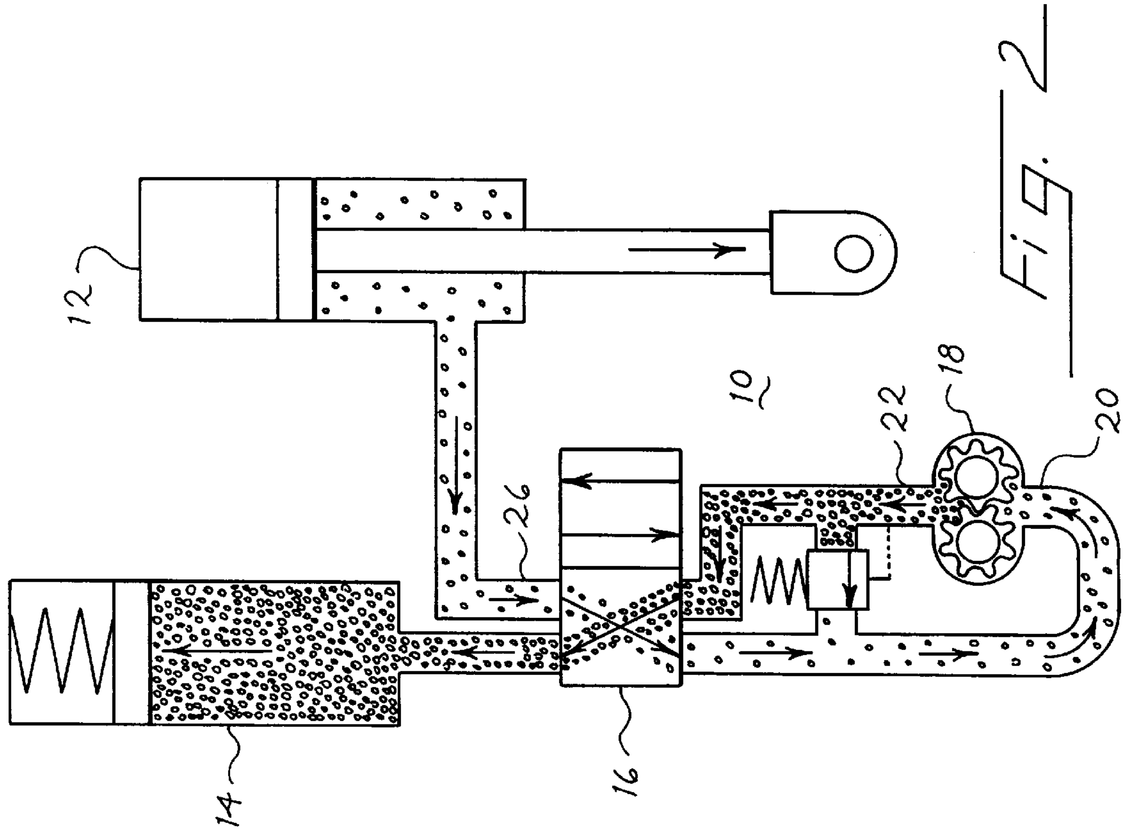
FIGS. 1 and 2 are schematic views of a hydraulic system in first and second modes of operation, respectively.

The hydraulic system 10 includes two basic modes of operation as illustrated in FIGS. 1 and 2, respectively. In FIGS. 1 and 2 higher pressure hydraulic fluid is indicated with a more densely stippled region 28 and lower pressure hydraulic fluid is indicated with a less densely stippled region 30.

In the first mode of operation (FIG. 1), the valve 16 is positioned in a first position, in which the pump outlet 22 is connected via the hydraulic cylinder port 26 to the hydraulic cylinder 12, and in which the accumulator 14 is connected to the pump inlet 20. In this mode of operation pressurized hydraulic fluid from the accumulator 14 is further pressurized by the pump 18 and supplied to the hydraulic cylinder 12.

As shown in FIG. 2, in the second mode of operation the valve 16 is moved to the second position in which the output 22 of the pump 18 is connected to the accumulator 14, and in which the hydraulic cylinder 12 is connected via the hydraulic cylinder port 26 and the valve 16 to the pump inlet 20. In this mode of operation pressurized hydraulic fluid from the cylinder 12 passes through the pump 18 and is stored in the accumulator 14. In this way, the need to dump the hydraulic fluid from the hydraulic cylinder to a drain at atmospheric pressure is avoided, and the energy of the stored hydraulic fluid in the accumulator 14 is available for use when the valve 16 is returned to the first position of FIG. 1 to power the hydraulic cylinder 12.

Figure 4:
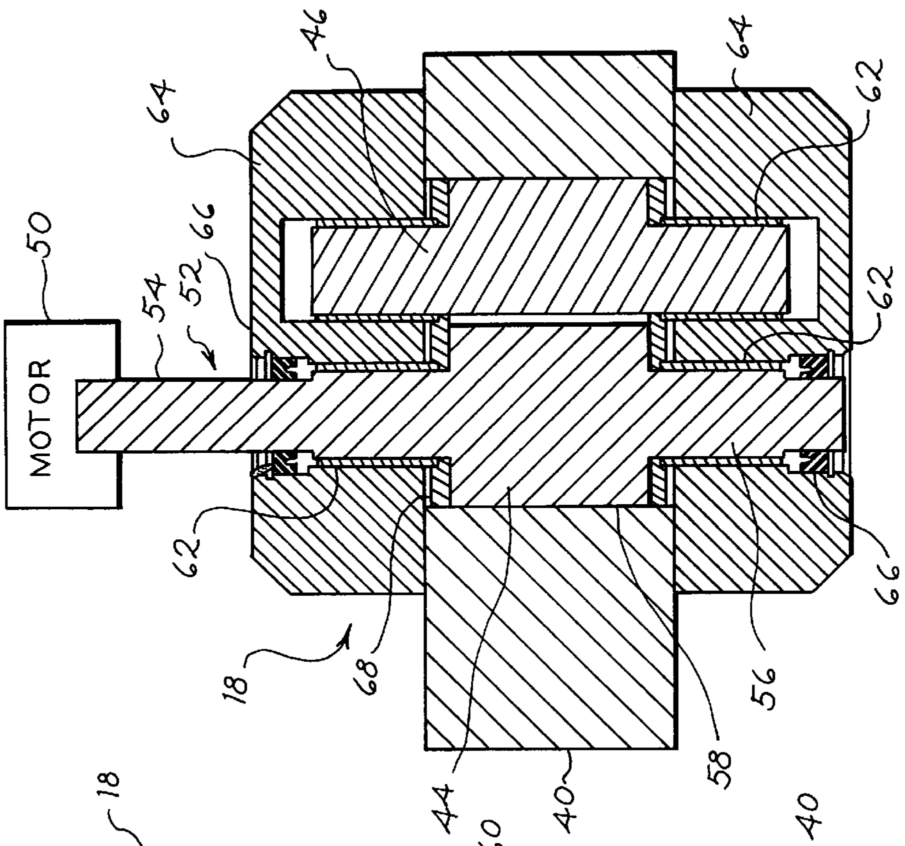
FIG. 4 is a cross sectional view of the gear pump of FIG. 3 taken in a plane transverse to that of FIG. 3.
Figure 3:
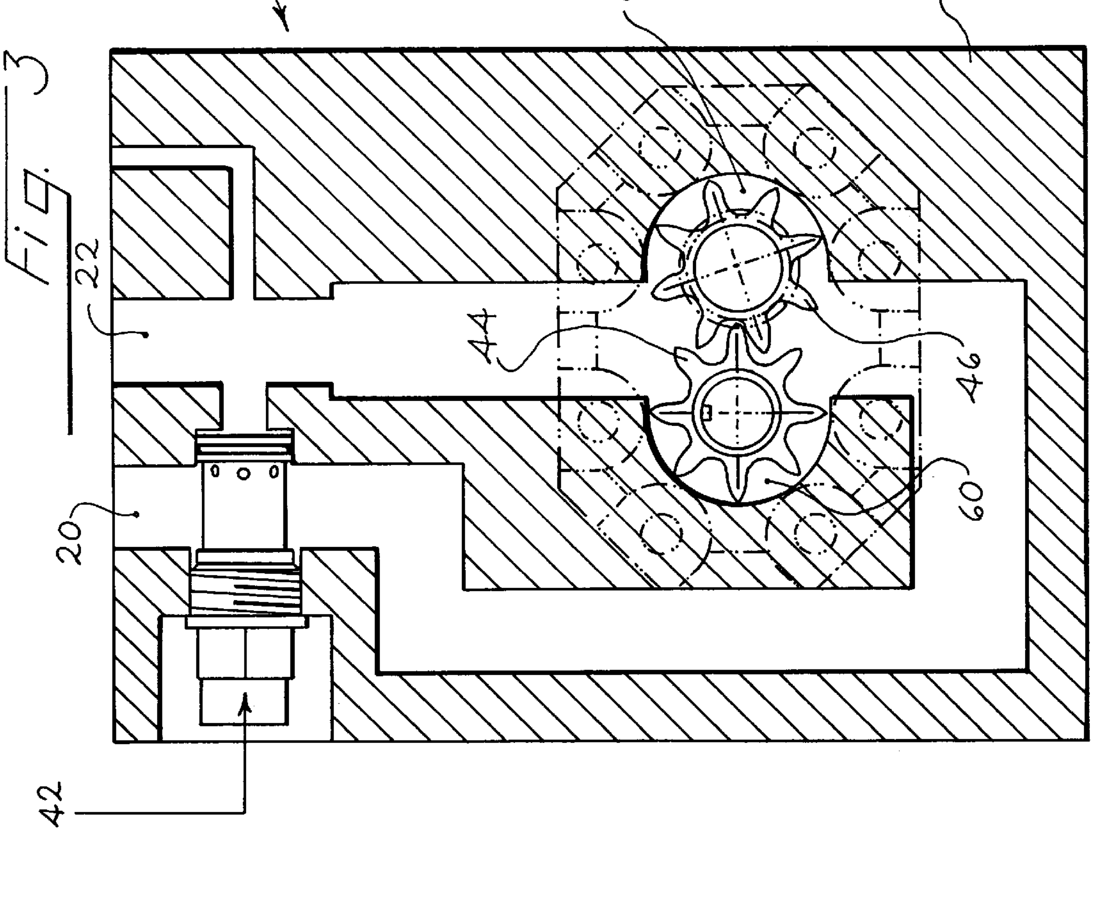
FIG. 3 is a cross sectional view of the gear pump of FIGS. 1 and 2.

FIGS. 3 and 4 provide further information regarding a preferred pump 18 suitable or use in the hydraulic system of FIGS. 1 and 2. As shown in FIGS. 3 and 4, the pump 18 includes a body 40. In this embodiment the body includes upper and lower caps 64 (FIG. 4), and the three basic components of the body 40 are bolted together by threaded fasteners (not shown). The body 40 supports a driven gear 44 and a follower gear 46 for rotation, as well as a pressure relief valve 42 that is positioned between the inlet 20 and the outlet 22 (FIG. 3). The pressure relief valve 42 ensures that pressures above a preset limit in the outlet 22 are conducted back to the inlet 20, thereby preventing pressure at the outlet 22 from exceeding a predetermined threshold.

As best shown in FIG. 4, the driven gear 44 is connected to a motor 50 which can take any suitable form. For example, electric motors, internal combustion engines, and turbines can be used for the motor 50. The motor 50 rotates a pumping element 52 which in this embodiment includes first and second coaxial shafts 54, 56 which extend from either side of a central element 58. In this embodiment the central element 58 corresponds to the driven gear 44 of FIG. 3. As shown in FIG. 3, the driven gear 44 defines hydraulic fluid recesses 60 that cooperate with hydraulic fluid recesses 60 of the follower gear 46 to provide the conventional pumping action of the gear pump.

Returning to FIG. 4, bearings 62 are provided around the first and second shafts 54, 56 such that the shafts 54, 56 and therefore the pumping element 52 are mounted for rotation in the body 40. A wear plate 68 is mounted around the shaft 54 adjacent to the central element 58. As shown in FIG. 4, two high pressure seals 66 are provided. Each high pressure seal 66 is disposed around the respective shaft 54, 56 adjacent an outer surface of the respective cap 64. Each high pressure seal 66 substantially prevents leakage of high pressure hydraulic fluid past the seal 66.

In this embodiment the high pressure seals 66 are U cup seals, though any suitable high pressure seal can be used. As used herein, the term “high pressure seal” is used to refer to a seal capable of sealing against the flow of hydraulic fluid pressurized to a pressure in a working range that extends beyond about 1000 psi.

The high pressure seals 66 simultaneously perform two separate functions. First, they substantially eliminate leakage of hydraulic fluid out of the pump body 40 around the shafts 54, 56. Second, they prevent the accumulation of high pressure hydraulic fluid at the stub end of the shaft 56. If such high pressure hydraulic fluid were to accumulate within the pump body 40, it would result in an asymmetrical force tending to push the upper wear plate 68 (in the orientation of FIG. 4) against the respective cap 64, thereby generating undesired heat and friction. By properly sealing both of the shafts 54, 56 with high pressure seals 66, this disadvantage is substantially eliminated in the pump 18.

Figure 5:
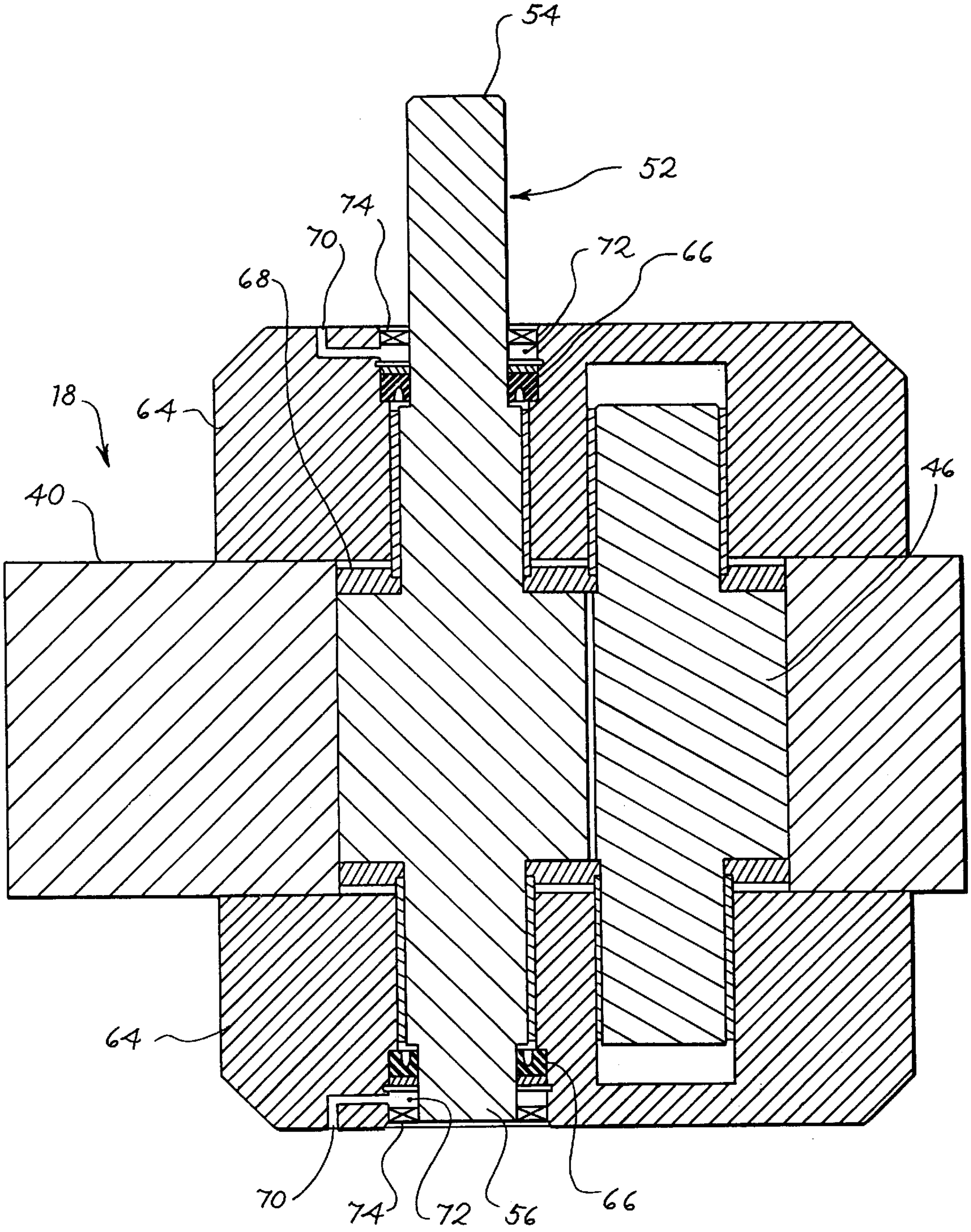
FIGS. 5 and 6 are cross sectional views corresponding to that of FIG. 4 of modified forms of the gear pump of FIGS. 3 and 4.

FIG. 5 shows a first modification of the pump 18, in which drains 70 are provided for regions 72 adjacent to the high pressure seals 66. Such drains are useful for environmental and housekeeping reasons, but they are not required in all embodiments. In the embodiment of FIG. 5 low pressure seals 74 prevent hydraulic fluid from leaking around the shafts 54, 56 adjacent the outer surfaces of the caps 64. The drains 70 preferably are coupled to a drain tank at atmospheric pressure. The two drains 70 can be joined to a common drain, or they may be individually ported to a holding tank. In the embodiment of FIG. 5 the low pressure seals 74 can be seals such as O-rings, cup seals, or labyrinth seals. As used herein, the term “low pressure seal” is intended to cover seals having a maximum sealing pressure of no more than about 100 psi.

Figure 6:
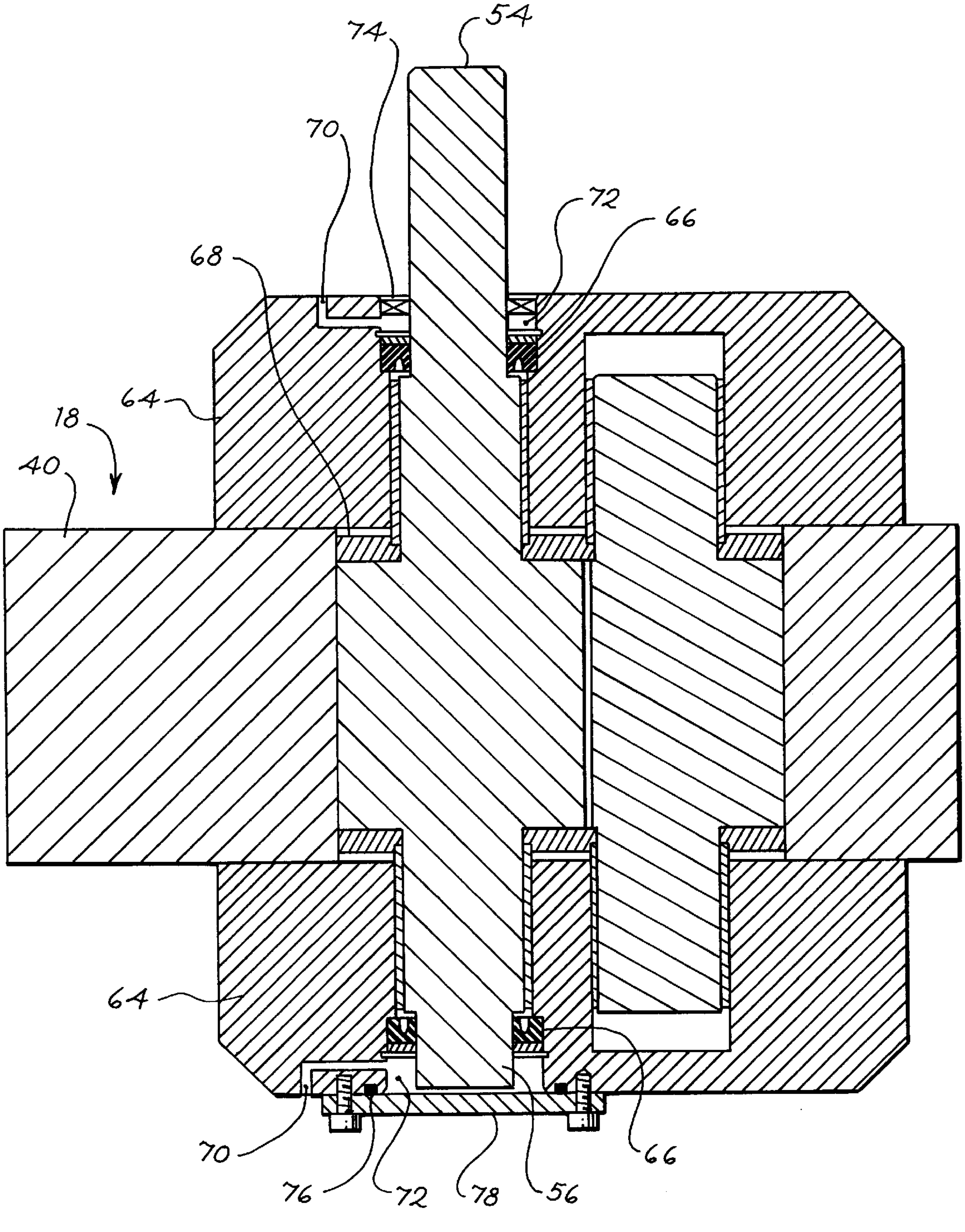

FIG. 6 shows another modified version of the pump 18, in which the low pressure seal adjacent the end of the shaft 56 is formed by an O-ring 76 and a cover plate 78. Other suitable low pressure seals can be used.

A wide variety of components can be adapted for use of this invention. Without intending any limitation on the following claims, the following details of construction are provided in order to define in greater detail the best mode of the invention that is presently contemplated by the inventor.

| Element | Source |
|---|---|
| Hydraulic Cylinder 12 | Great Bend Ind. (Great Bend, KS) #14830 |
| Accumulator 14 | Great Bend Ind. #14855 |
| High Pressure Seal 66 | American Variseal Corp. (Denver, CO) #567250-1135cv |
| Low Pressure Seal 74 | Chicago Rawhide #CR12438 |

The pump 18 can be formed as a modified version of the pump sold by Geartek as Part No. GT 7300. The principal modification is to provide the high pressure seals 66 and low pressure seals 74, 76 as described above.

The preferred embodiment described above can operate with the following pressures in the first and second modes of operation illustrated above in FIGS. 1 and 2. These illustrative pressures are suitable for a three-inch cylinder.

| Location | Hydraulic Pressure Mode 1 (PSI) | Hydraulic Pressure Mode 2 (PSI) |
|---|---|---|
| Hydraulic Cylinder 12 | 1600 | 1000 |
| Accumulator 14 | 1000 | 1600 |
| Pump Inlet 20 | 1000 | 1000 |
| Pump Outlet 22 | 1600 | 1600 |

The foregoing detailed description has described only a few of the many forms that the present invention can take. For example, this invention can readily be adapted for pneumatic systems in which the hydraulic fluid is a gas. For this reason, it is intended that the foregoing detailed description be regarded as an illustration of selected forms of the invention and not as a definition of the invention. It is only the following claims, including all equivalents, that are intended to define the scope of this invention.

I claim:

1. A hydraulic system for delivering pressurized hydraulic fluid to a hydraulic actuator, said system comprising:

a hydraulic fluid pump comprising a pump inlet and a pump outlet;

a pressure accumulator; and a hydraulic fluid valve comprising a hydraulic actuator port adapted for connection to the hydraulic actuator, said valve movable between first and second positions, said valve when in the first position directing fluid from the pump outlet to the hydraulic actuator and directing fluid from the accumulator to the pump inlet, said valve when in the second position directing fluid from the pump outlet to the accumulator and directing fluid from the hydraulic actuator port to the pump inlet.

2. The invention of claim 1 wherein said pump comprises:

a pump body;

a pumping element rotatably mounted in the pump body, said pumping element comprising first and second shafts extending outwardly from opposite sides of a central element, said central element forming hydraulic fluid receiving recesses, said first and second shafts journalled in the pump body; and first and second high pressure seals, each seal interposed between the pump body and a respective one of the shafts, said seals operative to substantially seal against hydraulic fluid flow between the shafts and the pump body away from the central element.

3. The invention of claim 1 or 2 wherein the pump comprises a gear pump, and wherein the central element comprises a gear.

4. The invention of claim 2 further comprising at least one hydraulic fluid drain coupled to the pump body to drain a respective region between the respective one of the shafts and the pump body, each region situated on a side of the respective seal opposite the central element.

5. The invention of claim 4 further comprising at least one low pressure seal, each low pressure seal situated adjacent the respective region to substantially seal against hydraulic fluid flow out of the pump body at the respective region.

6. The invention of claim 5 wherein said low pressure seals are each interposed between the pump body and the respective one of the shafts.

7. The invention of claim 2 wherein each high pressure seal comprises a respective annular cup seal.

* * * * *

UNITED STATES PATENT AND TRADEMARK OFFICE

CERTIFICATE OF CORRECTION

PATENT NO. : 5,916,139

DATED : June 29, 1999

INVENTOR(S) : James B. Tieben

It is certified that error appears in the above-identified patent and that said Letters Patent is hereby corrected as shown below:

On the Title Page

In column 1, delete "[73] Assignee: My-D Han-D Mfg. Co. Inc., Dodge City, Kans."

Signed and Sealed this

Eighth Day of May, 2001

*Attest:*

NICHOLAS P. GODICI

*Attesting Officer*

*Acting Director of the United States Patent and Trademark Office*